US012555032B2

(12) United States Patent
Chen et al.

(10) Patent No.: US 12,555,032 B2
(45) Date of Patent: Feb. 17, 2026

(54) FEATURE SELECTION VIA AN ENSEMBLE OF GATING LAYERS

(71) Applicant: Lemon Inc., Grand Cayman (KY)

(72) Inventors: Ming Chen, Los Angeles, CA (US);
Xia Xiao, Los Angeles, CA (US);
Youlong Cheng, Los Angeles, CA (US)

(73) Assignee: Lemon Inc., Grand Cayman (KY)

( * ) Notice: Subject to any disclaimer, the term of this patent is extended or adjusted under 35 U.S.C. 154(b) by 1116 days.

(21) Appl. No.: 17/537,185

(22) Filed: Nov. 29, 2021

(65) Prior Publication Data

US 2023/0169391 A1    Jun. 1, 2023

(51) Int. Cl.
*G06N 20/00* (2019.01)

(52) U.S. Cl.
CPC .................. *G06N 20/00* (2019.01)

(58) Field of Classification Search
CPC ........................................ G06N 20/00
See application file for complete search history.

(56) References Cited

U.S. PATENT DOCUMENTS

| | | | | |
|---|---|---|---|---|
| 10,410,118 | B2 * | 9/2019 | Xiong | G06N 3/08 |
| 11,030,528 | B1 | 6/2021 | Zhuo et al. | |
| 11,900,222 | B1 * | 2/2024 | Alakuijala | G06N 20/20 |
| 2020/0193297 | A1 * | 6/2020 | Verhoef | G06N 3/084 |
| 2021/0158145 | A1 * | 5/2021 | Lin | G06N 3/047 |

FOREIGN PATENT DOCUMENTS

WO    WO-2021222495 A1 * 11/2021 ........... G06K 9/6228

OTHER PUBLICATIONS

Liu et al.; "AutoFIS: Automatic FeatureInteractionSelectionin Factorization Modelsfor Click-ThroughRatePrediction"; 26" ACMSIGKDDInt'IConfonKnowledge Discovery& DataMining;2020;p. 2636-2645 (Year: 2020).*
Cai et al.; "ProxylessNAS: DirectNeuralArchitectureSearchonTarget-Taskand Hardware"; Int'IConf.onLearningRepresentations; 2019;13 pages (Year: 2019).*
International Patent Application No. PCT/SG2022/050805; Int'l Search Report and the Written Opinion; dated Jul. 19, 2023; 9 pages.
Liu et al.; "AutoFIS: Automatic Feature Interaction Selection in Factorization Models for Click-Through Rate Prediction"; 26th ACM SIGKDD Int'l Conf on Knowledge Discovery & Data Mining; 2020; p. 2636-2645.
Cai et al.; "ProxylessNAS: Direct Neural Architecture Search on Target Task and Hardware"; Int'l Conf. on Learning Representations; 2019; 13 pages.

* cited by examiner

*Primary Examiner* — Alexey Shmatov
(74) *Attorney, Agent, or Firm* — BakerHostetler

(57) ABSTRACT

Embodiments of the present disclosure relate to feature selection via an ensemble of gating layers. According to embodiments of the present disclosure, a plurality of gating layers is provided to be trained together with a machine learning model. At each update step, one of the plurality of gating layers is selected to perform gating parameter value update together with model parameter value update of the machine learning model. After the iterative update process, a set of target gating parameter values is determined from a plurality of sets of gating parameter values of the plurality of gating layers after the iterative update, and can be used to select a target subset of features to be conveyed from one layer to a next layer in the machine learning model.

20 Claims, 6 Drawing Sheets

500

---
Algorithm 1: Ensemble Gating
---
Input: Training set $\mathcal{D}$, *iter*
Parameter: Pretrained model $\phi$ with parameters $\Theta$, ensemble size $K$, initialized gating parameters $\{\alpha\}_K$
Output: Final gate states $\{g\}$
1: while *iter* $\neq 0$ do
2:   Sample a mini batch $X$ from $\mathcal{D}$.
3:   Pick a group of gates $\alpha^k$ using $k \sim Uniform\{1, ..., K\}$.
4:   Compute model predictions $\hat{y} = \phi(X|\alpha^k, \Theta)$.
5:   Optimize network parameters $\Theta$ by Eq. 3
6:   Optimize gating parameters $\alpha^k$ by Eq. 9
7:   Update *iter*.
8: end while
9: Generate output according to the selected aggregation method.
10: return output

*FIG. 5*

FEATURE SELECTION VIA AN ENSEMBLE OF GATING LAYERS

BACKGROUND

Machine learning models, especially deep neural networks have been used in artificial intelligence (AI) and computer vision fields. These models have shown promising performance in many tasks including recommendation, visual object recognition, natural language processing, and so on. However, the model architecture may have a large number of parameters, resulting in high computational cost and high memory usage.

To make machine learning models more computation and memory efficient, there have been proposed many approaches to reduce the size of the models, such as network pruning and adjusting feature embedding sizes. One of the network pruning approaches is feature selection, the goal of which is to choose a relatively small subset of features with the best explanatory power and remove redundant features. Selecting a subset of relevant features may result in several potential benefits: reducing experimental costs, enhancing interpretability, speeding up computation, reducing memory and even improving model generalization on unseen data.

BRIEF DESCRIPTION OF THE DRAWINGS

Through the following detailed descriptions with reference to the accompanying drawings, the above and other objectives, features and advantages of the example embodiments disclosed herein will become more comprehensible. In the drawings, several example embodiments disclosed herein will be illustrated in an example and in a non-limiting manner, where:

FIG. 5 illustrates an example algorithm for training the machine learning model and the ensemble of gating layers in accordance with some example embodiments of the present disclosure.

DETAILED DESCRIPTION

Figure 1:
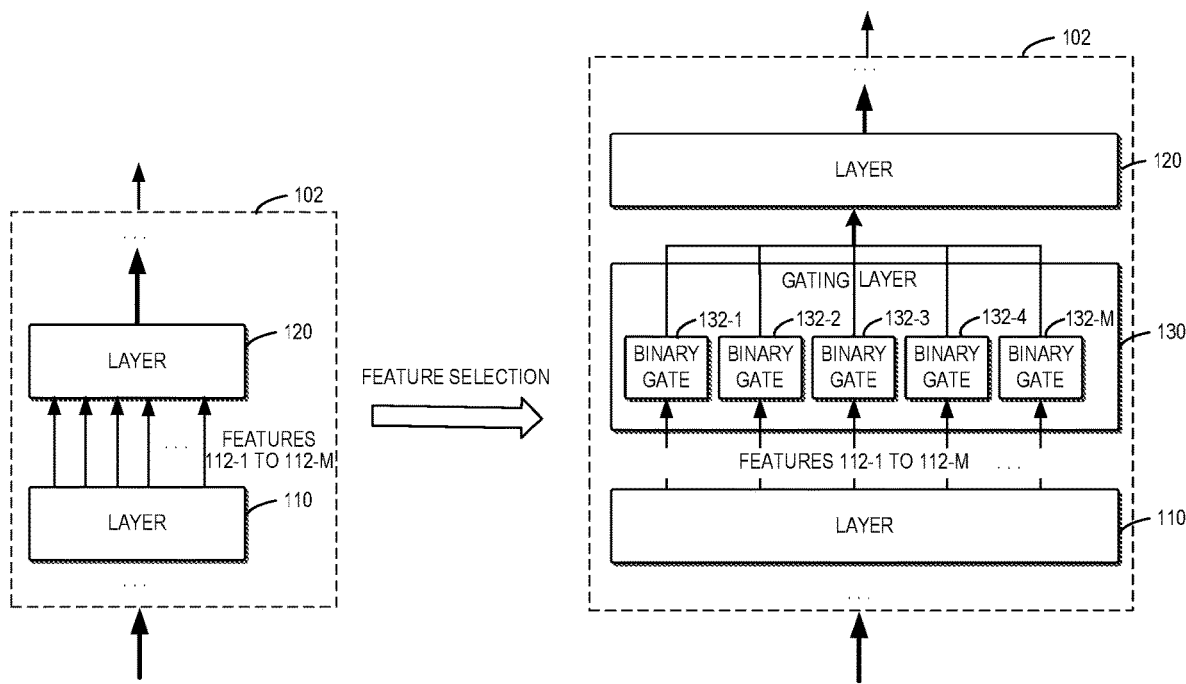
FIG. 1 illustrates a block diagram of an example feature selection environment for a machine learning model.

Principle of the present disclosure will now be described with reference to some embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an example embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used herein, the term "model" is referred to as an association between an input and an output learned from training data, and thus a corresponding output may be generated for a given input after the training. The generation of the model may be based on a machine learning technique. The machine learning techniques may also be referred to as artificial intelligence (AI) techniques. In general, a machine learning model can be built, which receives input information and makes predictions based on the input information. For example, a classification model may predict a class of the input information among a predetermined set of classes. As used herein, "model" may also be referred to as "machine learning model", "learning model", "machine learning network" or "learning network," which are used interchangeably herein.

Generally, machine learning may usually involve three stages, i.e., a training stage, a validation stage, and an application stage (also referred to as an inference stage). At the training stage, a given machine learning model may be trained (or optimized) iteratively using a great amount of training data until the model can obtain, from the training data, consistent inference similar to those that human intelligence can make. During the training, a set of parameter values of the model is iteratively updated until a training objective is reached. Through the training process, the machine learning model may be regarded as being capable of learning the association between the input and the output (also referred to an input-output mapping) from the training data. At the validation stage, a validation input is applied to the trained machine learning model to test whether the model can provide a correct output, so as to determine the performance of the model. At the application stage, the resulting machine learning model may be used to process an actual model input based on the set of parameter values obtained from the training process and to determine the corresponding model output.

As mentioned above, there may be hundreds of millions of parameters in a machine learning model, which requires a significant amount of memory to be stored and high computational cost to implement the machine learning model. Feature selection is useful in developing relatively small-scale machine learning models, for example, for industry application. The goal of feature selection is to choose a relatively small subset of features with the best explanatory power as a means to remove redundant features and reduce computational cost.

FIG. 1 illustrates a block diagram of an example feature selection environment for a machine learning model. In FIG. 1, a machine learning model 102 comprising a plurality of layers is provided, as illustrated at the left side of the figure. The machine learning model 102 may be of any machine learning or deep learning architectures, for example, a neural network. The machine learning model 102 may be configured to implement any tasks such as recommendation, visual object recognition, natural language processing, and the like.

An input to the machine learning model 102 may be processed layer by layer in the machine learning model 102. The input is received at the first layer (i.e., an input layer) of the machine learning model 102 for processing. An output of a layer is provided as an input to a next layer and the output of the last layer is considered as an output of the machine learning model 102. For example, for a recommendation model, the input to the model may comprise data related to the recommendation scenario while the output of the model may comprise a probability that a user likes an item.

A layer in the machine learning model 102 is typically configured with a set of model parameter values to process its input and generate its output. The output generated by a layer and conveyed to a next layer in the machine learning model 102 generally referred to as "features." A feature may be a real-valued multi-dimensional vector, also called an embedding or a latent vector. As specifically illustrated in FIG. 1, a layer 110 in the machine learning model 102 extracts a set of M features 112-1 to 112-M (where M is an integer larger than one), which are conveyed to a next layer 102 for further processing. For purpose of discussion, the M features 112-1 to 112-M may be collectively or individually referred to as features 112.

Generally, each layer may be configured with respective model parameter values to further process respective features extracted by the preceding layer. To reduce memory usage and computational cost, it is expected to prune the machine learning model 102 by selecting a subset of features with good explanatory power and remove less predictive features to be conveyed to the next layer. As such, the next layer may not need to process the removed features and the model parameter values for the removed features may not be stored.

The feature selection can be implemented by inserting a gating layer between two layers of the machine learning model 102. As illustrated at the right side of FIG. 1, a gating layer 130 is inserted between the layer 110 and the layer 120. The gating layer 130 may be configured with a set of gating parameter values to control whether and which features 112 extracted at the layer 110 are selected to be conveyed to the layer 120.

The setting of the gating parameter values of the gating layer 130 can control which features can be selected for use. For example, the gating layer 130 may comprise a set of M binary gates 132-1, 132-2, 132-3, 132-4, . . . , 132-M (collectively or individually referred to as binary gates 132 for the purpose of discussion), each used to control selection or pruning of one of M features extracted by the layer 110. A binary gate 132 may be constructed as a differentiable binary function, with an output of 1 indicating that the corresponding feature is selected and an output of 0 indicating that the corresponding feature is removed. An output of a binary gate 132 depends on the gating parameter value of the binary function. With the respective gating parameter values, the set of M binary gates 132 are each "on" or "off" to allow a subset of features 112 to be conveyed from the layer 110 to the layer 120.

It would be appreciated that the layer 110 in FIG. 1 may be the first layer or there may be one or more layers before the layer 110 in the machine learning model 102. Similarly, the layer 120 may be the last layer or there may be one or more layers after the layer 120 in the machine learning model 102. It would also be appreciated that although one gating layer is illustrated in FIG. 1, more than one layer may be inserted between different pairs of consecutive layers in the machine learning model 102 to filter the features conveyed between those layers.

It is desired to select informative features with good explanatory power for further processing in the machine learning model because pruning such features may lead to damage of model performance. The gating parameter values of a gating layer for feature selection are trainable with respect to a machine learning model. It has proposed to train the machine learning model while simultaneously training the gating layer.

Since the feature selection problem is essentially a search problem with the search space comprised of all possible gating decisions, to find the most informative subset of features, the gates need to fully explore the search space by taking various gating decisions and comparing the outcomes. However, in the gating approach, the gating exploration is mainly driven by the gradients propagated in the machine learning model, which doesn't always provide a strong enough exploration incentive, especially when the binary gates are jointly optimized with the model parameter values. Such joint optimization doesn't provide sufficient exploration within the search space of the gating decisions and can easily get trapped into sub-optimal local minima.

The inventors designed a special experiment to illustrate how insufficient exploration can result in undesirable outcomes. In this experiment, a deep neural network with a gating layer inserted therein is trained with a normal learning rate and a small learning rate of the gating layer (reducing the learning rate of binary gates by a factor of ten). The goal of this learning rate change is to exaggerate the negative effects of insufficient exploration. Specifically, it is supposed that the gradient signal suggests the $i^{th}$ gate should be changed from "on" to "off" and supposed that there is no other exploration incentive except the gradient, since the learning rate of binary gates is abnormally small. It may take more update steps for the $i^{th}$ gate to change its state. However, before the $i^{th}$ gate is turned off, the model parameters have already been fine-tuned according to the current gating decision. In this case, changing gate states will instead increase the training loss. This phenomenon is called gating overfitting. The gating overfitting phenomenon may significantly damage the model performance.

Figure 2:
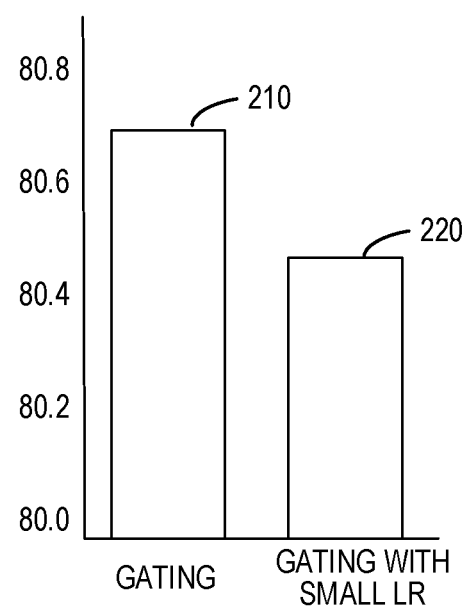
FIG. 2 illustrates a diagram showing model performance comparison with different learning rates.

FIG. 2 illustrates a diagram showing model performance comparison with the different learning rates ("LR"). It is observed that in the gating-based feature selection, if the learning rate is reduced (for example, by a factor of ten), the model performance of the machine learning model, which is measured by an area under the receiver (AUC) score, is downgraded from an AUC score 210 to an AUC score 220, which verifies that the gating overfitting makes the model performance compromised.

According to example embodiments of the present disclosure, there is proposed a scalable and effective solution for learning a gating layer for feature selection in a machine learning model. In this solution, a plurality of gating layers is provided to be trained together with a machine learning model. At each update step, one of the plurality of gating layers is selected to perform gating parameter value update together with model parameter value update of the machine learning model. By iteratively performing the update step, each of the plurality of gating layers can have an opportunity to have its set of gating parameter values updated for several times. After the iterative update process, e.g., after a training objective is achieved, a set of target gating parameter values is determined from a plurality of sets of gating parameter values of the plurality of gating layers after the iterative update, and can be used to select a target subset of features to be conveyed from one layer to a next layer in the machine learning model.

The ensemble gating solution proposed in the present disclosure can enhance gating exploration through an ensemble of gating layers and prevent gating overfitting. It is possible to provide effective uncertainty-driven exploration to search for the best subset of features. In addition, the training of the gating layers and machine learning model does not add any computational overhead or introducing any hyper-parameter (except the size of the ensemble).

Figure 3:
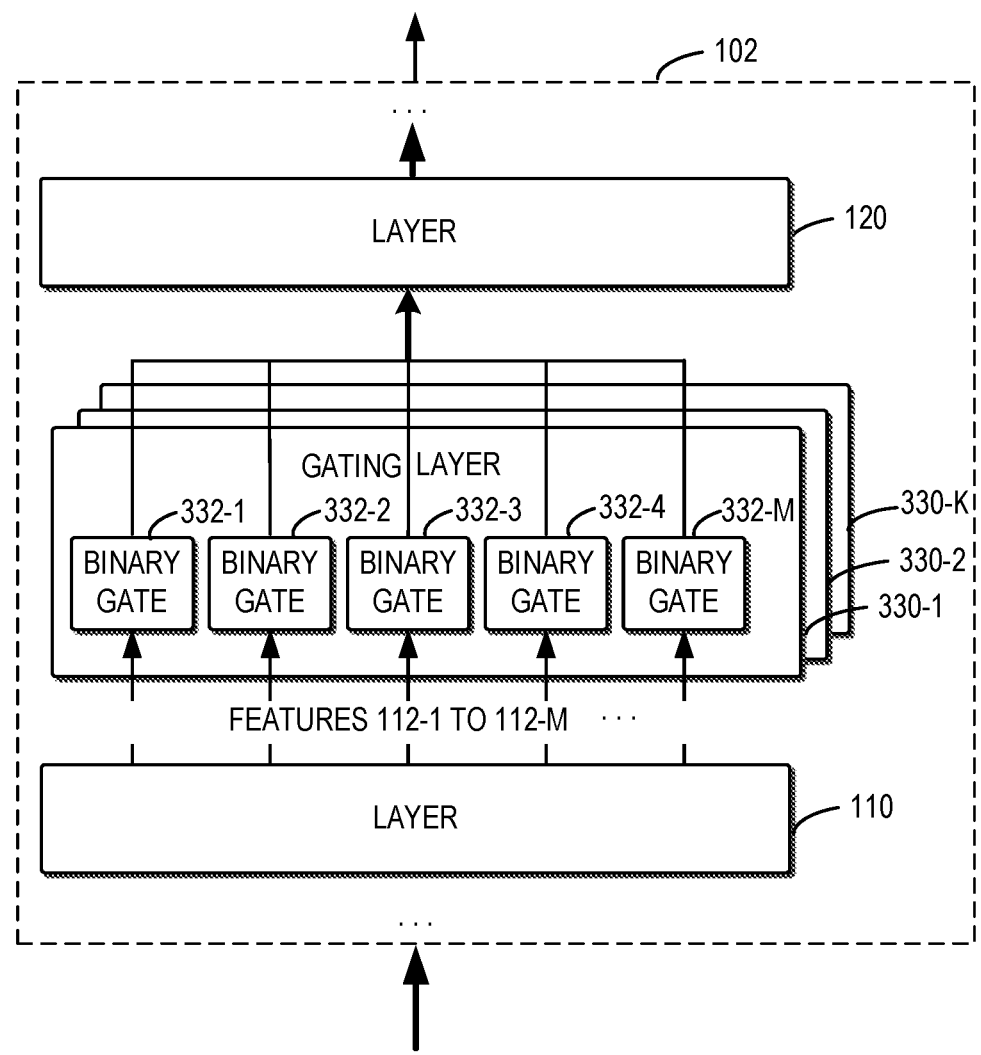
FIG. 3 illustrates a block diagram of an example training architecture for feature selection via an ensemble of gating layers in accordance with some example embodiments of the present disclosure.

Reference is now made to FIG. 3, which illustrates a block diagram of an example training architecture for feature selection via an ensemble of gating layers in accordance with some example embodiments of the present disclosure. The training architecture is configured to learn the machine learning model 102 together with determining a target gating layer for feature selection in the machine learning model 102.

As illustrated in FIG. 3, according to the ensemble gating approach proposed herein, a plurality of K gating layers 330-1, 330-2, . . . , 330-K are connected between the layer 110 and the layer 120 of the machine learning model 102 to be trained, where K is an integer lager than one. For the purpose of discussion, the gating layers 330-1, 330-2, . . . , 330-K may be collectively or individually referred to as gating layer 330. The number of the gating layers 330 (i.e., K) is a hyper-parameter, which may be preconfigured.

Each of the K gating layers 330 is configured with a set of gating parameter values to control whether and which of the M features 112 extracted at the layer 110 are selected to be conveyed to the layer 120. Each gating parameter value at a gating layer 330 is corresponding to one feature 112. Selecting or pruning a feature 112 depends on the setting of the gating parameter value. In some embodiments, as illustrated in FIG. 3, a gating layer 330 may comprise a set of M binary gates 332-1, 332-2, 332-3, 332-4, . . . , 332-N (collectively or individually referred to as binary gates 332 for the purpose of discussion), each configured with a gating parameter value to control the selection or pruning of a corresponding feature of M features 112. It is noted that although the binary gates 332 in the gating layer 330 are explicitly illustrated in FIG. 3, each of the other gating layers 330 also comprises a similar set of binary gates.

In embodiments of the present disclosure, to mitigate the gating overfitting issue and achieve more effective gating exploration, rather than having only one gating layer with one group of binary gates, K gating layers 330 with respective sets of gating parameter values are to be trained with the machine learning model 102. As such, a better exploration can benefit the process of deriving a target set of gating parameter values to be applied for feature selection in the machine learning model 102.

Generally speaking, the plurality of gating layers 330 is jointly optimized with the machine learning model 102. All the gating layers 330 share the same underlying model parameter values of the machine learning model 102. In each update step, one of the plurality of gating layers 330 are selected to perform gating parameter value update with the machine learning model 102. Those gating layers 330 can thus explore the search space of all the possible gating decisions from different directions. The resulting gating parameter values of the gating layers 330 obtained after the updating process may be aggregated to derive the target set of gating parameter values for use in the trained machine learning model 102.

To better understand the joint optimization of the plurality of gating layers 330 and the machine learning model 102, the processing and optimization of a machine learning model 102 and a single gating layer 330 will be first described.

It is assumed that the input X to the machine learning model 102 consists of M categorical feature fields. Each input raw categorical feature is initially represented by a sparsely encoded vector $x_i$, with i from 1 to M. Then, one or more layers of the machine learning model 102 may transform each sparsely encoded feature $x_i$ into a V-dimensional feature 112 $e_i$ as follows:

$$e_i = E_i^T x_i \quad (1)$$

where $E_i \in R^{D \times V}$ denotes a subset of model parameter values applied to the input sparsely encoded vector $x_i$ by the layer 110 and if present, one or more layers before the layer 110 in the machine learning model 102, and D denotes the size of the sparse encoding. Note that in this example, it is assumed that a global size V is used for all the features 112, although features with different sizes may also be extracted at the layer 110. The features 112 may be concatenated into a feature matrix that is used by the remaining parts of the machine learning model for further processing, to generate the output of the model.

It is assumed that θ represents a subset of model parameter values applied by the layer 120 and if present, one or more layers after the layer 120 in the machine learning model. Then the whole set of model parameter values of the machine learning model 102 may be represented as Θ={E, θ}, and the output of the machine learning model 102 is given by:

$$\hat{y} = \phi(X|\Theta) \quad (2)$$

where X is the input, φ represents the machine learning model 102, $\hat{y}$ is the output prediction. Note that the architecture of feature interaction layers may vary in different recommendation models.

The training process of the machine learning model 102 is to iteratively update the model parameter values of the machine learning model 102 Θ, until a training objective for the machine learning model 102 is achieved. A training dataset may be utilized to train the machine learning model 102. The training dataset may comprise a large number of input training samples and labeling information indicating corresponding ground-truth outputs for the respective input training samples. An objective function that measures the error (or distance) between the predicted outputs and the ground-truth outputs is used in training. Such an error is also called a loss of the machine learning, and the objective function may also referred to as a loss function. More specifically, the model parameter values Θ are updated to reduce the error calculated from the objective function. The training objective may be achieved until the objective function is optimized, for example, until the calculated error is minimized or reaches a desired target.

In Some Embodiments, the Training Objective for the Machine Learning Model 102 ϕ May be Represented as Follows:

$$\min_{\Theta} \mathcal{L}(\phi(X|\Theta), \mathcal{D}) \tag{3}$$

where $\mathcal{D}$ is the training dataset for the machine learning model 102, $\mathcal{L}$ is the loss function (for example, a binary cross-entropy function) along with a weight decay regularization term. In Eq. (3), the loss function $\mathcal{L}(\phi(X|\Theta), \mathcal{D})$ represents an error between predicted outputs calculated by the machine learning model 102 with the input training samples applied to the model and the ground-truth outputs labeled for those input training samples. In this example, the training objective is to find an optimized set of model parameter values Θ that can minimize the objective function $\mathcal{L}$ in Eq. (3).

The goal of feature selection is to select N features from the M features extracted at a layer of the machine learning model 102, where N is an integer larger than or equal than one, and N is smaller than M. It is expected to remove less informative or redundant features and convey remaining features to the next layer for future processing. A gating layer 330 comprising a set of M binary gates 332 may be configured with M real-valued gating parameter values $\{\alpha_i\}$, which matches the number of the features 112. For each gating parameter value $\alpha_i$, a binary gate 332 may apply a differentiable binarize function to convert it into a binarized output $g_i$ that indicates whether to prune or keep a feature 112 $e_i$, which is represented as follows:

$$g_i = \text{binarize}(\alpha_i) = \begin{cases} 0, & \text{if } e_i \text{ is pruned;} \\ 1, & \text{otherwise} \end{cases} \tag{4}$$

Accordingly, the feature 112 $e_i$ extracted by the layer 110 is replaced with the masked feature $\{\tilde{e}_i\}$:

$$\tilde{e}_i = g_i \cdot e_i \tag{5}$$

In Eq. (5), if the binarized output $g_i$ is zero, the feature 112 $e_i$ may not be selected to be conveyed to the next layer 120.

The binarize function applied at the binary gate 332 may be flexible as long as the function can (coarsely) map any real value into {0, 1} and the backward gradient can be accurately estimated. Some example binarize functions may include a softmax function (with properly picked temperature) and a step function with straight through estimator (STE). In some embodiments, to improve the exploration capacity, the step function with STE may be used, in which the binary gating decision is given by:

$$\text{binarize\_STE}(\alpha_i) = \begin{cases} 1, & \text{if } \alpha_i > 0; \\ 0, & \text{otherwise} \end{cases} \tag{6}$$

The training process of a gating layer 330 is to iteratively update the gating parameter values α together with the model parameter values, until a training objective for the gating layer 330 is achieved. A training dataset may be utilized to train the gating layer 330. Similarly to the training dataset $\mathcal{D}$, the training dataset for the gating layer training may comprise a large number of input training samples to the machine learning model and labeling information indicating corresponding ground-truth outputs for the respective input training samples. Thus, an objective function that measures the error (or distance) between the predicted outputs and the ground-truth outputs is also used in training the gating layer.

In the case that a single gating layer is inserted for feature selection, in some embodiments, the gating parameter values are trained to minimize the following loss function:

$$\min_{\alpha} \mathcal{L}(\phi(X|\Theta, \alpha), \mathcal{D}_g) + \beta_s R_s(\alpha) \tag{7}$$

where $\mathcal{D}_g$ is the training dataset used for gating parameters training, $\mathcal{L}$ is the loss function, $R_s$ is the sparse regularization term that controls the degree of sparsity, and $\beta_s$ is the weight of the sparse regularization.

In Eq. (7), the term $\phi(X|\Theta, \alpha)$, $\mathcal{D}_g$) in the loss function represents an error between predicted outputs calculated by the machine learning model 102 with the input training samples applied to the model and the ground-truth outputs labeled for those input training samples. In this example, the training objective is to find an optimized set of gating parameter values α that can reduce and minimize the error, and then minimize the whole objective function $\mathcal{L}$ in Eq. (7).

In Eq. (7), $R_s$ is typically defined with the difference between an expected number of selected features and the predicted number of features to be selected by the gating layer. In some embodiments, $R_s$ may be determined as follows:

$$R_s(\alpha_i) = \begin{cases} \text{count}(g_i = 1), & \text{if count}(g_i = 1) > \text{target;} \\ 0, & \text{otherwise} \end{cases} \tag{8}$$

where target represents the expected number of selected features, and count($g_i$=1) represents the number of binary gates which provides an binarized output $g_i$ of "1" to select the corresponding feature to be conveyed to the next layer. Thus, count($g_i$=1) is equal to the predicted number of features to be selected by the gating layer with the current parameter values.

With the sparse regularization term $R_s$, if the predicted number of features is larger than the expected number of selected features, i.e., if the difference between the predicted number of features and the expected number of selected features is not zero, the error calculated by the loss function in Eq. (7) may still be relatively larger. As a result, the gating parameter values may still need to be updated in order to minimize the loss function. That is, a penalty may be applied to increase the error calculated by the loss function if the predicted number of features and the expected number of selected features. Note that according to Eq. (8), no penalty is applied when the predicted number of features is lower than the target number of selected features, because this usually leads to an increase in training loss and the gradient will push the gating layer to select more features. It would be appreciated that in some embodiments, the sparse regularization term $R_s$ may be omitted from the loss function in Eq. (7) and the scope of the present disclosure is not limited in this regard.

Unlike inserting one gating layer between layers of the machine learning model for training, in embodiments of the present disclosure as described above, K gating layers 330 are inserted in the machine learning model 102, and their respective sets of gating parameter layers (represented as $\{\alpha_i^k\}_K^{k=1}$) all need to be optimized. All the K gating layers 330 share the same underlying model parameter values $\Theta$. As mentioned above, one of the K gating layers 330 may be selected to perform gating parameter value updates together with the machine learning mode 102. In some embodiments, similar to formulated in Eq. (7), the gating parameter values $\alpha^k$ of a $k^{th}$ gating layer 330 be performed to minimize the following loss function:

$$\min_{\alpha^k} \mathcal{L}(\phi(X|\Theta, \alpha^k), \mathcal{D}_{batch}) + \beta_s R_s(\alpha^k) \quad (9)$$

where $\mathcal{D}_{batch}$ represents a mini-batch of training data sampled from the training dataset $\mathcal{D}_g$ for gating parameters training, and this mini-batch of training data is used for the gating parameter value update at an update step with the machine learning model 102.

Hence, the overall loss function for the K gating layers 330 may be written as:

$$\min_{\alpha} \frac{1}{K} \sum_K^k (\mathcal{L}(\phi(X|\Theta, \alpha^k), \mathcal{D}_k) + \beta_s R_s(\alpha^k)) \quad (10)$$

where $\mathcal{D}_k$ represents the subset of training data for the $k^{th}$ gating layer 330 in the training dataset $\mathcal{D}_g$. The training objective of the K gating layers 330 is find respective optimized sets of gating parameter values $$\{\alpha_i^k\}_K^{k=1}$$

that can minimize the whole loss function $\mathcal{L}$ in Eq. (10).

To yield the best feature selection result, the model parameter values $\Theta$ and the gating parameter values $\alpha$ are updated iteratively. At each update step, one of the plurality of gating layers 330 is selected to perform gating parameter value update together with model parameter value update of the machine learning model 102.

Figure 4:
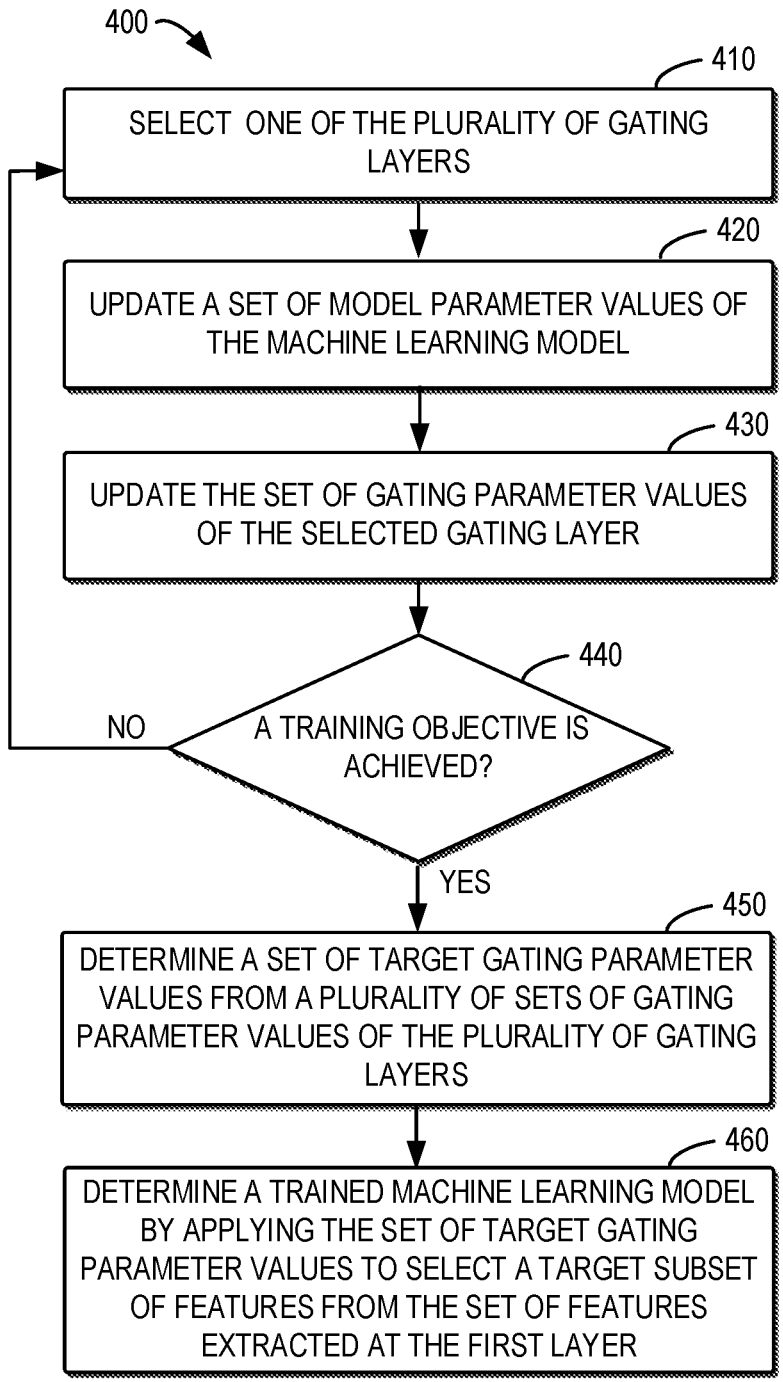
FIG. 4 illustrates a flowchart of a process in accordance with some example embodiments of the present disclosure.

FIG. 4 illustrates a flowchart of a process 400 for training the machine learning model and the ensemble of gating layers in accordance with some example embodiments of the present disclosure. As illustrated in FIG. 4, operations at blocks 410 to 430 are iteratively performed until a training objective is achieved.

At each update step, one of the plurality of (K) gating layers 330 is selected at block 410. Each time a $k^{th}$ gating layers 330 may be randomly selected and activated to control whether respective features in a set of features 112 extracted at the layer 110 are selected to be conveyed to the layer 120 in the machine learning model. In some embodiments, the $k^{th}$ gating layers 330 may be selected according to a uniform distribution from 1 to K, represented as k~Uniform{1, . . . , K}.

At block 420, a set of model parameter values of the machine learning model 102 $\Theta$ are updated. Initially, the machine learning model 102 may be configured with initial model parameter values $\Theta$ set randomly or determined according to a pre-training process of the model. When updating the model parameter values $\Theta$, the gating parameter values $\alpha$ at the binary gates are fixed.

In some embodiments, the model parameter values $\Theta$ may be updated according to Eq. (3) with a mini-batch of training data sampled from the training dataset $\mathcal{D}$. The mini-batch of training data may comprise a set of input training samples, each of which can be input to the machine learning model 102 to generate a corresponding predicted output using the current model parameter values $\Theta$. At this time, among all the K gating layers 330, the selected $k^{th}$ gating layers 330 is activated to select, based on its current gating parameter values $\alpha^k$, a subset of features from the set of features 112 to be conveyed from the layer 110 to the layer 120. Hence, for an input training sample, a predicted output of the machine learning model is generated based on the subset of selected features 112. According to the loss function in Eq. (3), an error between the predicted outputs and the ground-truth outputs for the input training samples may be calculated and used to update the current model parameter values $\Theta$.

In some embodiments, a gradient-based learning algorithm may be utilized to determine how the model parameter values $\Theta$ are updated according to Eq. (3). The learning algorithm may calculates a gradient vector that, for each model parameter value, indicates by what amount the error would increase or decrease if the model parameter value were increased by a tiny amount. The model parameter value is then adjusted in the opposite direction to the gradient vector. The error calculated by the loss function is to average over all the input training samples. In practice, a procedure called stochastic gradient descent (SGD) is typically used, which is well known in the art.

After the model parameter values $\Theta$ are updated using the mini-batch of sampled training data, at block 430, the set of gating parameter values $\alpha^k$ of the selected ($k^{th}$) gating layer 330 are updated. When updating the gating parameter values $\alpha^k$, the model parameter values $\Theta$ are fixed.

In some embodiments, the gating parameter values $\alpha^k$ may be updated according to Eq. (9) with a mini-batch of training data $\mathcal{D}_{batch}$ sampled from the training dataset $\mathcal{D}_g$. The mini-batch of training data may comprise a set of input training samples, each of which can be input to the machine learning model 102 to generate a corresponding predicted output using the model parameter values $\Theta$ updated at block 410. At this time, among all the K gating layers 330, the selected $k^{th}$ gating layers 330 is activated to select, based on its current gating parameter values $\alpha^k$, a subset of features from the set of features 112 to be conveyed from the layer 110 to the layer 120. Hence, for an input training sample, a predicted output of the machine learning model 102 is generated based on the subset of selected features 112. According to the loss function in Eq. (9), an error between the predicted outputs and the ground-truth outputs for the input training samples may be calculated and used to update the gating parameter values $\alpha^k$.

In some embodiments, similar to the update of the model parameter values $\Theta$, a gradient-based learning algorithm may be utilized to determine how the gating parameter values $\alpha^k$ are updated according to Eq. (9). In some embodiments, if the binary gates 332 are implemented with a step function with STE, the gradient is computed as if the step function with STE is an identity function.

In some embodiments, the training datasets $\mathcal{D}$ and $\mathcal{D}_g$ may be the same or different from each other. In some embodiments, making $\mathcal{D} = \mathcal{D}_g$ can be more computationally efficient. More specifically, the mini-batches of training data sampled for updating the model parameter values and the gating parameter values at each update step may be the same because one single backward gradient pass is needed at each update step when the same input training samples are shared.

The gating parameter values for each of the gating layers 330 may be initialized before the iterative update. In some embodiments of the present disclosure with the ensemble of gating layers to be trained, the gating parameter values may be randomly initialized according to uniform distributions. In some embodiments, to increase the inter-layer diversity, for a given feature 112, the corresponding K gating parameter values configured in the K gating layers 330 to control selection of this feature may be initialized according to a corresponding uniform distribution. The K gating parameter values configured in the K gating layers 330 to control selection of the $i^{th}$ feature 112 may be represented as $$\alpha_i^K.$$

As such, the K gating parameter values $$\alpha_i^K$$

may be initialized to more evenly spread the gating parameter values in the search space and to lower the chance to get trapped in any unexpected local minima.

The uniform distribution may be defined with a lower limit value and an upper limit value. In some embodiments, the uniform distribution may be based on an expected percentage of initial gating parameter values configured to allow the $i^{th}$ feature 112 to be selected, and/or a predetermined initial magnitude for the K gating parameter values $$\alpha_i^K.$$

The expected percentage may be set as a value ranged from 0 to 100%, which may be determined based on the expected number of gating layers that are initially configured to allow the $i^{th}$ feature 112 to be selected and the total number of features 112 (i.e., K). For example, it may not be desirable if most of the gating layers 330 are initialized to let certain features 112 to be pruned because this may avoid the gating layers 330 to learn the importance of those features. The predetermined initial magnitude for the plurality of gating parameter values is used as a constraint for the initial gating parameter values in the gating layers 330 for a certain feature 112. For different features 112, the expected percentage and the predetermined initial magnitude may be different or the same.

The lower limit value and the upper limit value of the uniform distribution may be determined based on the predetermined percentage of features expected to be selected from the set of features, and/or the predetermined initial magnitude. In some embodiments, assuming that the binary function applied in the binary gates 332 of the K gating layers 330 is the step function with STE, the K gating parameter values $\alpha_i^K$ for the $i^{th}$ feature may be initialized according to the following uniform distribution:

$$\alpha_i^K \sim \text{Uniform}(-c \cdot (1 - p), c \cdot p) \qquad (11)$$

where p is the predetermined percentage of features expected to be selected from the set of features (e.g., 0.8), and c represents the initial magnitude of the K gating parameter values $\alpha_i^K$ (e.g., 0.01). Traditionally, gating parameter values of a gating layer are usually initialized to a constant value to make sure every corresponding feature gets considered and fine-tuned at the beginning. However, this is not a concern in the ensemble gating approach of the present disclosure because for any feature $e_i$, the probability that $\alpha_i^K$ are all initialized to negative values is very low.

In each update step, the model parameter values $\Theta$ are updated with a mini-batch of training sample to approximate the minimization of the corresponding loss function (e.g., Eq. (3), and the gating parameter values $\alpha^k$ of the selected $k^{th}$ gating layer 330 are updated with a mini-batch of training sample to approximate the minimization of the corresponding loss function (e.g., Eq. (9). After the model parameter values $\Theta$ and the gating parameter values $\alpha^k$ are updated, at block 440, it is determined whether a training objective is achieved. The training objective for the joint update of the model parameter values $\Theta$ and the K gating layers 330 is based on joint optimization of the loss function for training the model and the loss function for gating training. For example, the training objective is achieved when the loss function in Eq. (3) and Eq. (10) are both minimized or the errors calculated by the loss functions reach a desired target.

If the training objective is not achieved at block 440, the operations at blocks 410, 420, and 430 are repeated again until the training objective is achieved.

For the training of the gating parameter values, intuitively, the gating exploration is driven by the inter-layer disagreements. For most important features 112, there can be a significant increase in training loss if they are dropped by the gates. So all the K gating layers 330 may soon reach a consensus on keeping those features. On the contrary, for other less informative features, the gating layers 330 may need to take more exploratory actions (by varying their gating decisions and comparing the outcomes) to determine their influence on the model performance. Randomly selecting one gating layer 330 to perform gating parameter value update is actually simulating this exploration behavior. The agreement/disagreement on selecting or pruning a certain feature among the ensemble of gating layers can be interpreted as the gating layer's predictive uncertainty over feature importance. Through the training process, the features that are considered important with high confidence get fine-tuned constantly. While for features whose importance is yet to be determined, the gating layers 330 may continuously explore different gating decisions. As a consequence, those features may get fine-tuned more equally and less frequently, thereby effectively preventing the gating overfitting issue.

If it is determined that the training objective is achieved at block 440, the process 400 proceeds to block 450. At block 450, a set of target gating parameter values are determined from a plurality of sets of gating parameter values of the plurality of gating layers 330 after the iteratively performing.

In the iterative update process, the respective sets of gating parameter values of the K gating layers 330 are all optimized. The machine learning model 102 is also trained and optimized in that process. The respective sets of gating parameter values derived after the iterative update process may be aggregated to derive a set of target gating parameter values, which may form a target gating layer for the trained machine learning model 102. There are some candidate aggregation approaches that can be applied to aggregate the sets of gating parameter values of the K gating layers 330.

In some embodiments, a majority voting approach may be applied to determine the set of target gating parameter values. The binarized gating decisions represented by the gating parameter values from all the K gating layers 330 may be summed up, and the expected number of selected features (i.e., N features) that receive the most votes may be determined. The gating parameter values that control the selected N features may form the set of target gating parameter values.

More specifically, for each of the M features 112 extracted at the layer 110, there may be K corresponding gating parameter values that are used control selection this feature in the K gating layers 330. A highest gating parameter values among the K corresponding gating parameter values may be selected for each feature 112. As a result, there may be M highest gating parameter values each selected for one of the M features 112. The set of target gating parameter values may be selected based on a ranking of those M highest gating parameter values. The number of selected target gating parameter values may be equal to the expected number of selected features, i.e., N.

In some embodiments, an averaging approach may be applied to determine the set of target gating parameter values. More specifically, for each of the M features 112 extracted at the layer 110, there may be K corresponding gating parameter values that are used control selection of this feature in the K gating layers 330. Those K gating parameter values may be averaged obtain a target gating parameter value used to control the selection of the feature, which may be represented as $$\left\{ \overline{\alpha}_i = \frac{1}{K} \sum\nolimits_{K}^{k=1} \alpha_i^k \right\}.$$

The averaged gating parameter value $\{\overline{\alpha}_i\}$ may thus be used to control the feature selection.

In some embodiments, a minimal retraining loss approach may be applied to determine the set of target gating parameter values. In this approach, K reference machine learning models with the same model configuration may be constructed. The K reference machine learning models may be retrained from scratch with a few training data. Then each of the K reference machine learning models may have one of the plurality of gating layers 330 inserted between the layer similar to the layer 110 and a next layer similar to the layer 120. The inserted gating layer 330 works with the corresponding set of gating parameter values determined from the iterative update process.

The respective model accuracy levels of the K reference machine learning models may be then determined. In some embodiments, the model accuracy levels of a reference machine learning model may be determined by applying a set of input training samples, generating a set of corresponding predicted outputs from the model, and measuring an error between the predicted outputs and corresponding ground-truth outputs for the input training samples. One of the plurality of sets of gating parameter values may be selected as the set of target gating parameter values based on the plurality of model accuracy levels. For example, the reference machine learning model with the highest model accuracy level may be identified and the set of gating parameter values configured for the gating layer 330 in this reference machine learning model may be selected because it can provide the highest model performance.

It would be appreciated that other aggregation approaches may also be applied to aggregate the K sets of gating parameter values of the K gating layers 330, to derive the set of target gating parameter values.

At block 460, a trained machine learning model is determined by applying the set of target gating parameter values to select a target subset of features from the set of features 112 extracted at the layer 110 to be conveyed to the layer 120 in the machine learning model 102. The set of target gating parameter values may be applied by a target gating layer in the trained machine learning model, with M binary gates corresponding to the M features 112 extracted at the layer 110, to determine which features 112 can be selected to be conveyed to the next layer 120 when the trained machine learning model 102 operates.

FIG. 5 illustrates an example algorithm 500 for training the machine learning model and the ensemble of gating layers in accordance with some example embodiments of the present disclosure. The example algorithm 500 may be considered as an example of the process 400.

Figure 6:
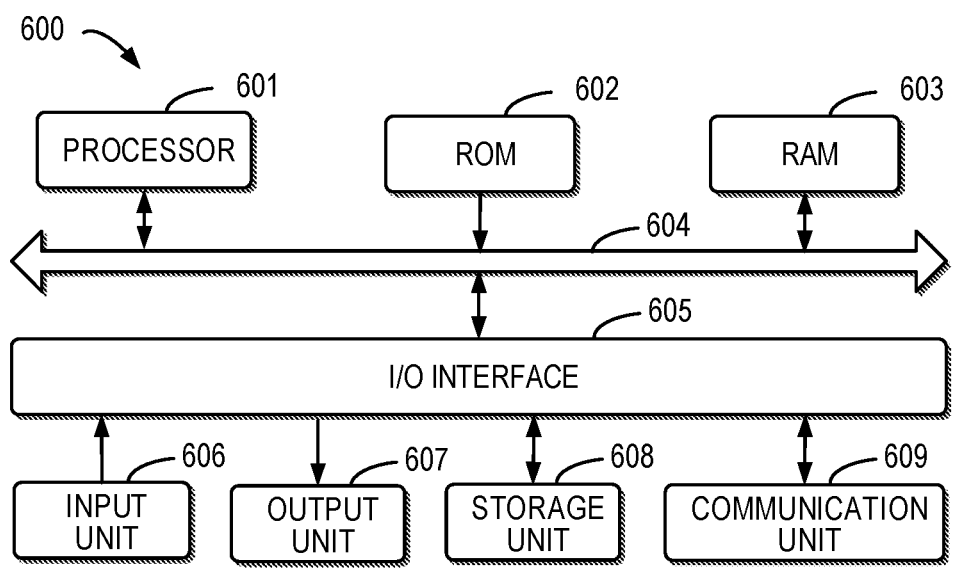
FIG. 6 illustrates a block diagram of an example computing system/device suitable for implementing example embodiments of the present disclosure.

FIG. 6 illustrates a block diagram of an example computing system/device 600 suitable for implementing example embodiments of the present disclosure. The training of the machine learning model 102 and the gating layers 330 described in the above embodiments may be implemented at the system/device 600. The system/device 600 may be a general-purpose computer, a physical computing device, or a portable electronic device, or may be practiced in distributed cloud computing environments where tasks are performed by remote processing devices that are linked through a communication network. The system/device 600 can be used to implement the process 400 of FIG. 4.

As depicted, the system/device 600 includes a processor 601 which is capable of performing various processes according to a program stored in a read only memory (ROM) 602 or a program loaded from a storage unit 608 to a random access memory (RAM) 603. In the RAM 603, data required when the processor 601 performs the various processes or the like is also stored as required. The processor 601, the ROM 602 and the RAM 603 are connected to one another via a bus 604. An input/output (I/O) interface 605 is also connected to the bus 604.

The processor 601 may be of any type suitable to the local technical network and may include one or more of the following: general purpose computers, special purpose computers, microprocessors, digital signal processors (DSPs), graphic processing unit (GPU), co-processors, and processors based on multicore processor architecture, as non-limiting examples. The system/device 600 may have multiple processors, such as an application-specific integrated circuit chip that is slaved in time to a clock which synchronizes the main processor.

A plurality of components in the system/device 600 are connected to the I/O interface 605, including an input unit 606, such as keyboard, a mouse, or the like; an output unit 607 including a display such as a cathode ray tube (CRT), a liquid crystal display (LCD), or the like, and a loudspeaker or the like; the storage unit 608, such as disk and optical disk, and the like; and a communication unit 609, such as a network card, a modem, a wireless transceiver, or the like. The communication unit 609 allows the system/device 600 to exchange information/data with other devices via a communication network, such as the Internet, various telecommunication networks, and/or the like.

The methods and processes described above, such as the process 400, can also be performed by the processor 601. In some embodiments, the process 400 can be implemented as a computer software program or a computer program product tangibly included in the computer readable medium, e.g., storage unit 608. In some embodiments, the computer program can be partially or fully loaded and/or embodied to the system/device 600 via ROM 602 and/or communication unit 609. The computer program includes computer executable instructions that are executed by the associated processor 601. When the computer program is loaded to RAM 603 and executed by the processor 601, one or more acts of the process 400 described above can be implemented. Alternatively, processor 601 can be configured via any other suitable manners (e.g., by means of firmware) to execute the process 400 in other embodiments.

In some example embodiments of the present disclosure, there is provided a computer program product comprising instructions which, when executed by a processor of an apparatus, cause the apparatus to perform steps of any one of the methods described above.

In some example embodiments of the present disclosure, there is provided a computer readable medium comprising program instructions for causing an apparatus to perform at least steps of any one of the methods described above. The computer readable medium may be a non-transitory computer readable medium in some embodiments.

In an eighth aspect, example embodiments of the present disclosure provide a computer readable medium comprising program instructions for causing an apparatus to perform at least the method in the second aspect described above. The computer readable medium may be a non-transitory computer readable medium in some embodiments.

Generally, various example embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of the example embodiments of the present disclosure are illustrated and described as block diagrams, flowcharts, or using some other pictorial representations, it will be appreciated that the blocks, apparatuses, systems, techniques, or methods described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the methods/processes as described above. Generally, program modules include routines, programs, libraries, objects, classes, components, data structures, or the like that perform particular tasks or implement particular abstract types. The functionality of the program modules may be combined or split between program modules as desired in various embodiments. Computer-executable instructions for program modules may be executed within a local or distributed device. In a distributed device, program modules may be located in both local and remote storage media.

The computer readable medium may be a computer readable signal medium or a computer readable storage medium. A computer readable medium may include but is not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Computer program code for carrying out methods disclosed herein may be written in any combination of one or more programming languages. The program code may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a computer, partly on the computer, as a stand-alone software package, partly on the computer and partly on a remote computer or entirely on the remote computer or server. The program code may be distributed on specially-programmed devices which may be generally referred to herein as "modules". Software component portions of the modules may be written in any computer language and may be a portion of a monolithic code base, or may be developed in more discrete code portions, such as is typical in object-oriented computer languages. In addition, the modules may be distributed across a plurality of computer platforms, servers, terminals, mobile devices and the like. A given module may even be implemented such that the described functions are performed by separate processors and/or computing hardware platforms.

While operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A method for improving accuracy of predictions generated by a machine learning model, comprising:
    configuring the machine learning model, wherein the machine learning model comprises a first layer and a second layer, wherein the machine learning model is configured with a set of model parameters;
    inserting a plurality of gating layers between the first layer and the second layer, wherein each of the plurality of gating layers comprises a plurality of binary gates, and wherein each of the plurality of gating layers is configured with a corresponding set of gating parameter values configured to control which features extracted at the first layer are conveyed to the second layer;
    performing a plurality of iterations for training the machine learning model, wherein each of the plurality of iterations comprises:
        activating only one of the plurality of gating layers,
        updating the set of model parameters while the set of gating parameter values corresponding to the activated gating layer are fixed, and
        updating the set of gating parameter values corresponding to the activated gating layer while the set of model parameters are fixed;
    determining a set of target gating parameter values based on aggregating a plurality of sets of updated gating parameter values, wherein each of the plurality of sets of updated gating parameter values corresponds to one of the plurality of gating layers after the performing the plurality of iterations; and
    optimizing the machine learning model to improve prediction accuracy by applying the set of target gating parameter values to select a target subset of features from a set of features extracted at the first layer to be conveyed to the second layer in the machine learning model.

2. The method of claim 1, further comprising:
    initializing the plurality of sets of gating parameter values of the plurality of gating layers before the performing the plurality of iterations;
    wherein for a given feature of the set of features extracted at the first layer, a plurality of gating parameter values configured in the plurality of gating layers to control selection of the given feature are initialized according to a uniform distribution.

3. The method of claim 2, wherein the uniform distribution is determined based on at least one of the following: an expected percentage of initial gating parameter values configured to allow the given feature to be selected, and a predetermined initial magnitude for the plurality of gating parameter values.

4. The method of claim 1, wherein determining the set of target gating parameter values comprises:
    for each feature of the set of features extracted at the first layer, identifying, from the plurality of sets of gating parameter values, a highest gating parameter value used to control selection of the feature in the plurality of gating layers; and
    selecting the set of target gating parameter values from the highest gating parameter values identified for the set of features, a number of selected target gating parameter values being equal to an expected number of selected features.

5. The method of claim 1, wherein determining the set of target gating parameter values comprises:
    for each feature of the set of features extracted at the first layer,
        identifying, from the plurality of sets of gating parameter values, gating parameter values used to control selection of the feature in the plurality of gating layers, and
        averaging the identified gating parameter values to obtain a target gating parameter value used to control the selection of the feature.

6. The method of claim 1, wherein determining the set of target gating parameter values comprises:
    constructing a plurality of reference machine learning models, each having one of the plurality of gating layers configured with a corresponding one of the plurality of sets of gating parameter values inserted between a first layer and a second layer in the reference machine learning model;
    determining a plurality of model accuracy levels of the plurality of reference machine learning models; and
    selecting one of the plurality of sets of gating parameter values as the set of target gating parameter values based on the plurality of model accuracy levels.

7. The method of claim 1, wherein updating the set of model parameters comprises:
    applying a first set of input training samples to the machine learning model, to obtain a first set of predicted outputs from the machine learning model;
    determining a first error between the first set of predicted outputs and a first ground-truth output for the first set of input training samples; and
    updating the set of model parameters based on the first error.

8. The method of claim 1, wherein updating the set of gating parameter values corresponding to the activated gating layer comprises:
    applying a second set of input training samples to the machine learning model with the set of updated model parameters, to obtain a second set of predicted outputs from the machine learning model;
    determining a second error between the second predicted outputs and ground-truth outputs for the second set of input training samples; and
    updating the set of gating parameter values based at least in part on the second error.

9. The method of claim 8, wherein updating the set of gating parameter values corresponding to the activated gating layer further comprises:
    determining a predicted number of features in a subset of features extracted at the first layer and selected to be conveyed to the second layer when the activated gating layer is activated in a round of update; and
    updating the set of gating parameter values further based on a difference between the predicted number of features and an expected number of selected features.

10. A system for improving accuracy of predictions generated by a machine learning model, comprising:
at least one processor; and
at least one memory communicatively coupled to the at least one processor and comprising computer-readable instructions that upon execution by the at least one processor cause the at least one processor to perform acts comprising:
configuring the machine learning model, wherein the machine learning model comprises a first layer and a second layer, wherein the machine learning model is configured with a set of model parameters;
inserting a plurality of gating layers between the first layer and the second layer, wherein each of the plurality of gating layers comprises a plurality of binary gates, and wherein each of the plurality of gating layers is configured with a corresponding set of gating parameter values configured to control which features extracted at the first layer are conveyed to the second layer;
performing a plurality of iterations for training the machine learning model, wherein each of the plurality of iterations comprises:
activating only one of the plurality of gating layers,
updating the set of model parameters while the set of gating parameter values corresponding to the activated gating layer are fixed, and
updating the set of gating parameter values corresponding to the activated gating layer while the set of model parameters are fixed;
determining a set of target gating parameter values based on aggregating a plurality of sets of updated gating parameter values, wherein each of the plurality of sets of updated gating parameter values corresponds to one of the plurality of gating layers after the performing the plurality of iterations; and
optimizing the machine learning model to improve prediction accuracy by applying the set of target gating parameter values to select a target subset of features from a set of features extracted at the first layer to be conveyed to the second layer in the machine learning model.

11. The system of claim 10, wherein the acts further comprise:
initializing the plurality of sets of gating parameter values of the plurality of gating layers before the performing the plurality of iterations;
wherein for a given feature of the set of features extracted at the first layer, a plurality of gating parameter values configured in the plurality of gating layers to control selection of the given feature are initialized according to a uniform distribution.

12. The system of claim 11, wherein the uniform distribution is determined based on at least one of the following: an expected percentage of initial gating parameter values configured to allow the given feature to be selected, and a predetermined initial magnitude for the plurality of gating parameter values.

13. The system of claim 10, wherein determining the set of target gating parameter values comprises:
for each feature of the set of features extracted at the first layer, identifying, from the plurality of sets of gating parameter values, a highest gating parameter value used to control selection of the feature in the plurality of gating layers; and
selecting the set of target gating parameter values from the highest gating parameter values identified for the set of features, a number of selected target gating parameter values being equal to an expected number of selected features.

14. The system of claim 10, wherein determining the set of target gating parameter values comprises:
for each feature of the set of features extracted at the first layer,
identifying, from the plurality of sets of gating parameter values, gating parameter values used to control selection of the feature in the plurality of gating layers, and
averaging the identified gating parameter values to obtain a target gating parameter value used to control the selection of the feature.

15. The system of claim 10, wherein determining the set of target gating parameter values comprises:
constructing a plurality of reference machine learning models, each having one of the plurality of gating layers configured with a corresponding one of the plurality of sets of gating parameter values inserted between a first layer and a second layer in the reference machine learning model;
determining a plurality of model accuracy levels of the plurality of reference machine learning models; and
selecting one of the plurality of sets of gating parameter values as the set of target gating parameter values based on the plurality of model accuracy levels.

16. The system of claim 10, wherein updating the set of model parameters comprises:
applying a first set of input training samples to the machine learning model, to obtain a first set of predicted outputs from the machine learning model;
determining a first error between the first set of predicted outputs and a first ground-truth output for the first set of input training samples; and
updating the set of model parameters based on the first error.

17. The system of claim 10, wherein updating the set of gating parameter values corresponding to the activated gating layer comprises:
applying a second set of input training samples to the machine learning model with the set of updated model parameters, to obtain a second set of predicted outputs from the machine learning model;
determining a second error between the second predicted outputs and ground-truth outputs for the second set of input training samples; and
updating the set of gating parameter values based at least in part on the second error.

18. The system of claim 17, wherein updating the set of gating parameter values corresponding to the activated gating layer further comprises:
determining a predicted number of features in a subset of features extracted at the first layer and selected to be conveyed to the second layer when the activated gating layer is activated in a round of update; and
updating the set of gating parameter values further based on a difference between the predicted number of features and an expected number of selected features.

19. A non-transitory computer-readable storage medium, storing computer-readable instructions that upon execution by a computing device cause the computing device to perform acts comprising:
configuring the machine learning model, wherein the machine learning model comprises a first layer and a second layer, wherein the machine learning model is configured with a set of model parameters;

inserting a plurality of gating layers between the first layer and the second layer, wherein each of the plurality of gating layers comprises a plurality of binary gates, and wherein each of the plurality of gating layers is configured with a corresponding set of gating parameter values configured to control which features extracted by the first layer are conveyed to the second layer;

performing a plurality of iterations for training the machine learning model, wherein each of the plurality of iterations comprises:
    activating only one of the plurality of gating layers,
    updating the set of model parameters while the set of gating parameter values corresponding to the activated gating layer are fixed, and
    updating the set of gating parameter values corresponding to the activated gating layer while the set of model parameters are fixed;

determining a set of target gating parameter values based on aggregating a plurality of sets of updated gating parameter values, wherein each of the plurality of sets of updated gating parameter values corresponds to one of the plurality of gating layers after the performing the plurality of iterations; and optimizing the machine learning model to improve prediction accuracy by applying the set of target gating parameter values to select a target subset of features from a set of features extracted at the first layer to be conveyed to the second layer in the machine learning model.

20. The non-transitory computer-readable storage medium of claim 19, wherein the acts further comprise:

initializing the plurality of sets of gating parameter values of the plurality of gating layers before the performing the plurality of iterations;

wherein for a given feature of the set of features extracted at the first layer, a plurality of gating parameter values configured in the plurality of gating layers to control selection of the given feature are initialized according to a uniform distribution.

* * * * *